B. F. SCHMIDT.
GEAR SHIFTING DEVICE FOR MOTOR VEHICLES.
APPLICATION FILED MAR. 6, 1913.
1,200,431.
Patented Oct. 3, 1916.
6 SHEETS—SHEET 2.
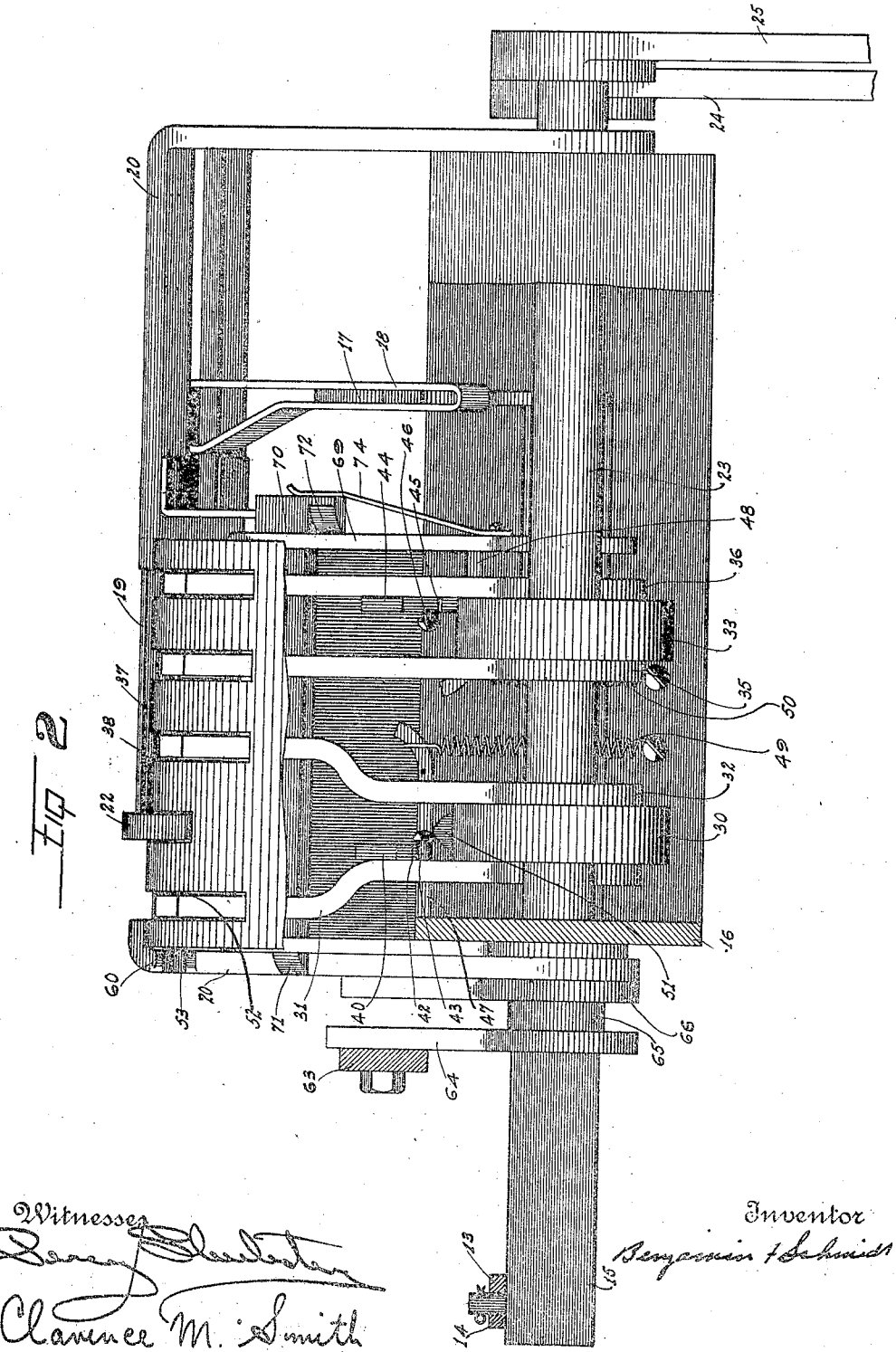

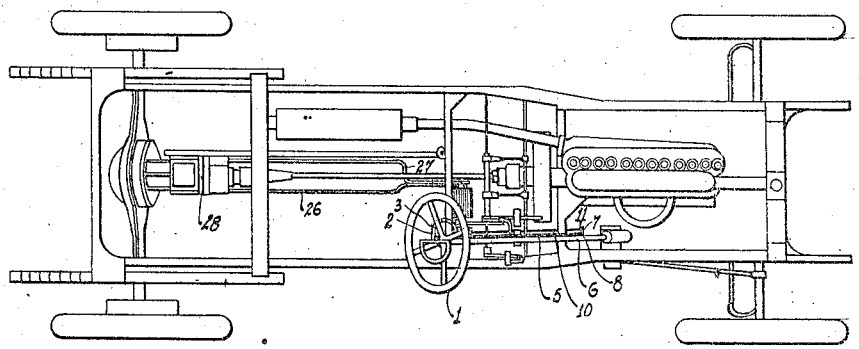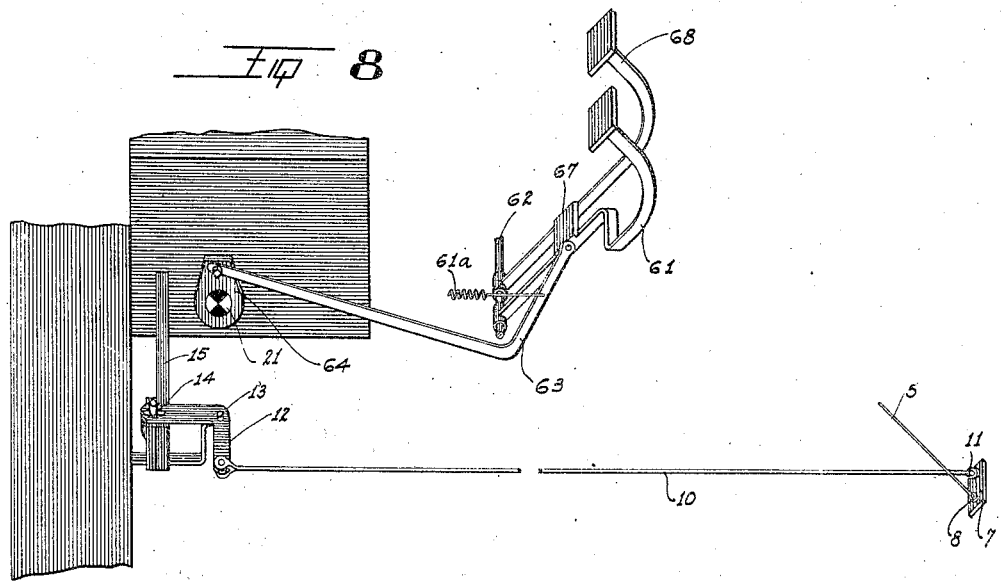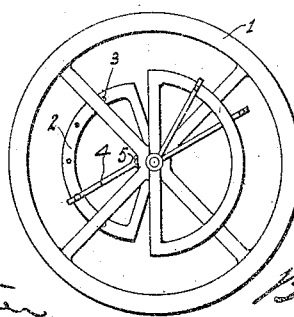

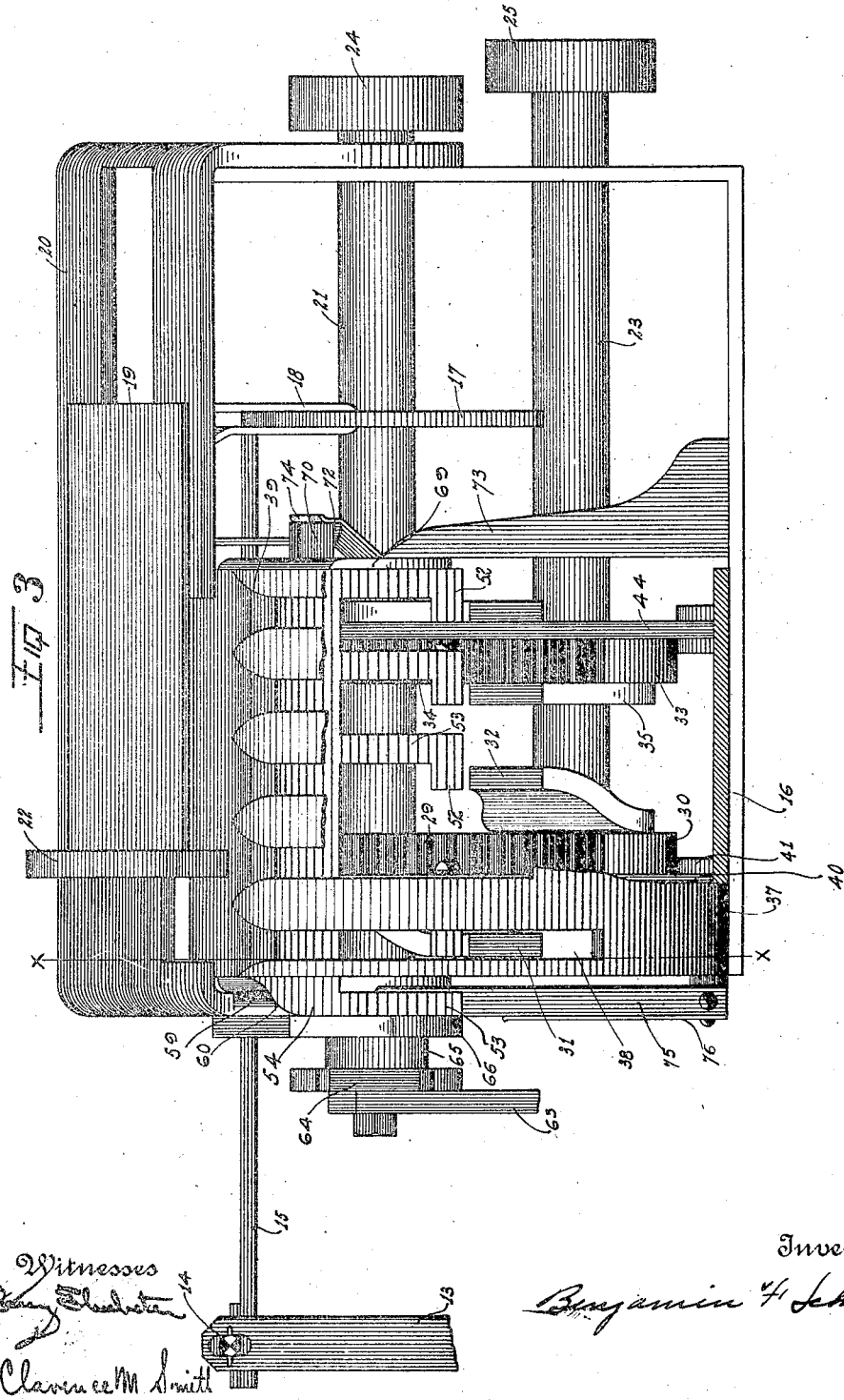

B. F. SCHMIDT.
GEAR SHIFTING DEVICE FOR MOTOR VEHICLES.
APPLICATION FILED MAR. 6, 1913.
1,200,431.
Patented Oct. 3, 1916.
6 SHEETS—SHEET 4.
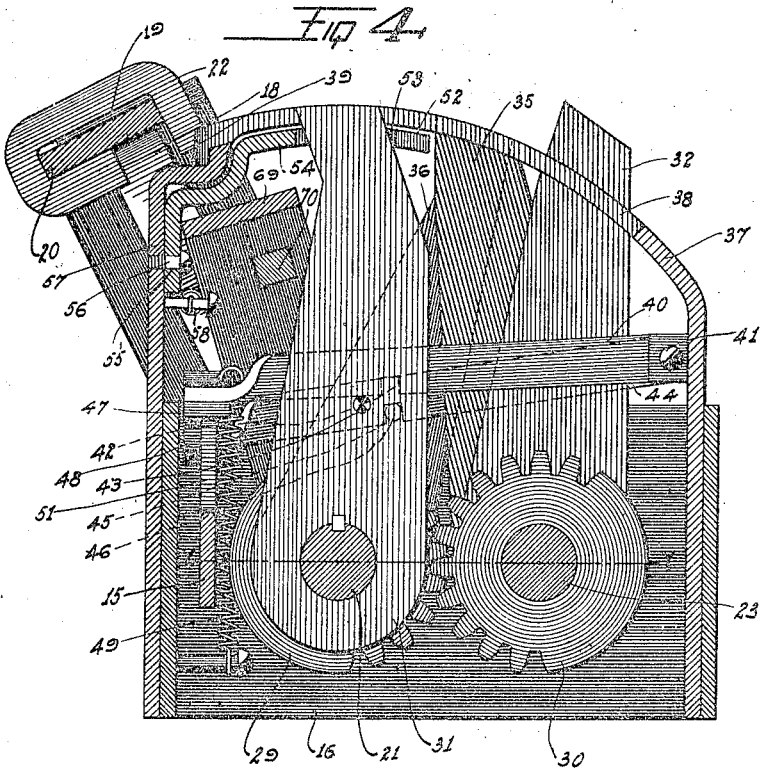
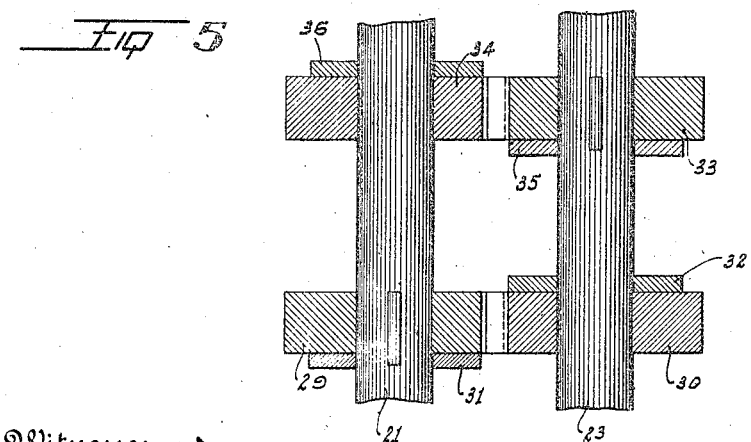

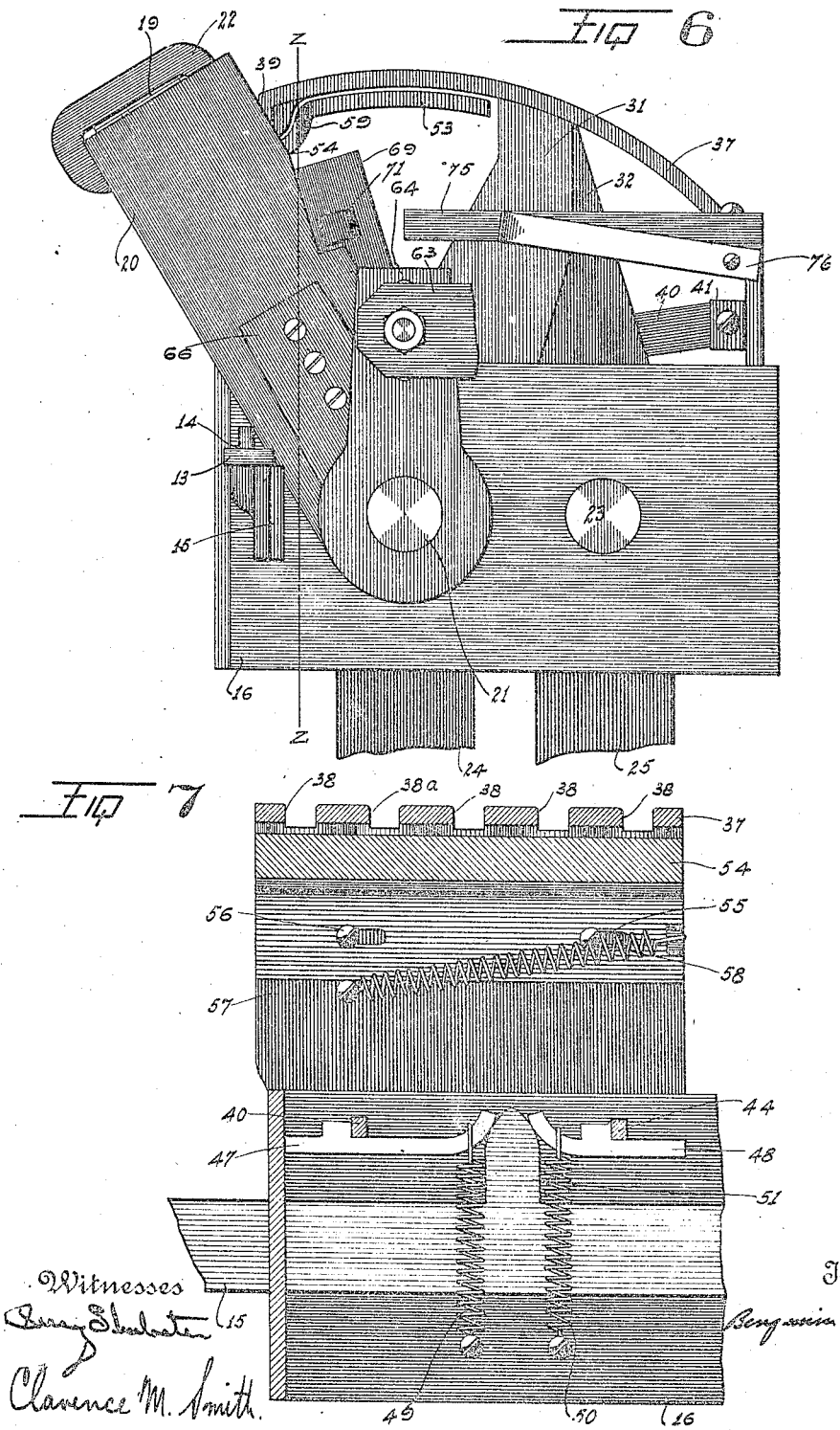

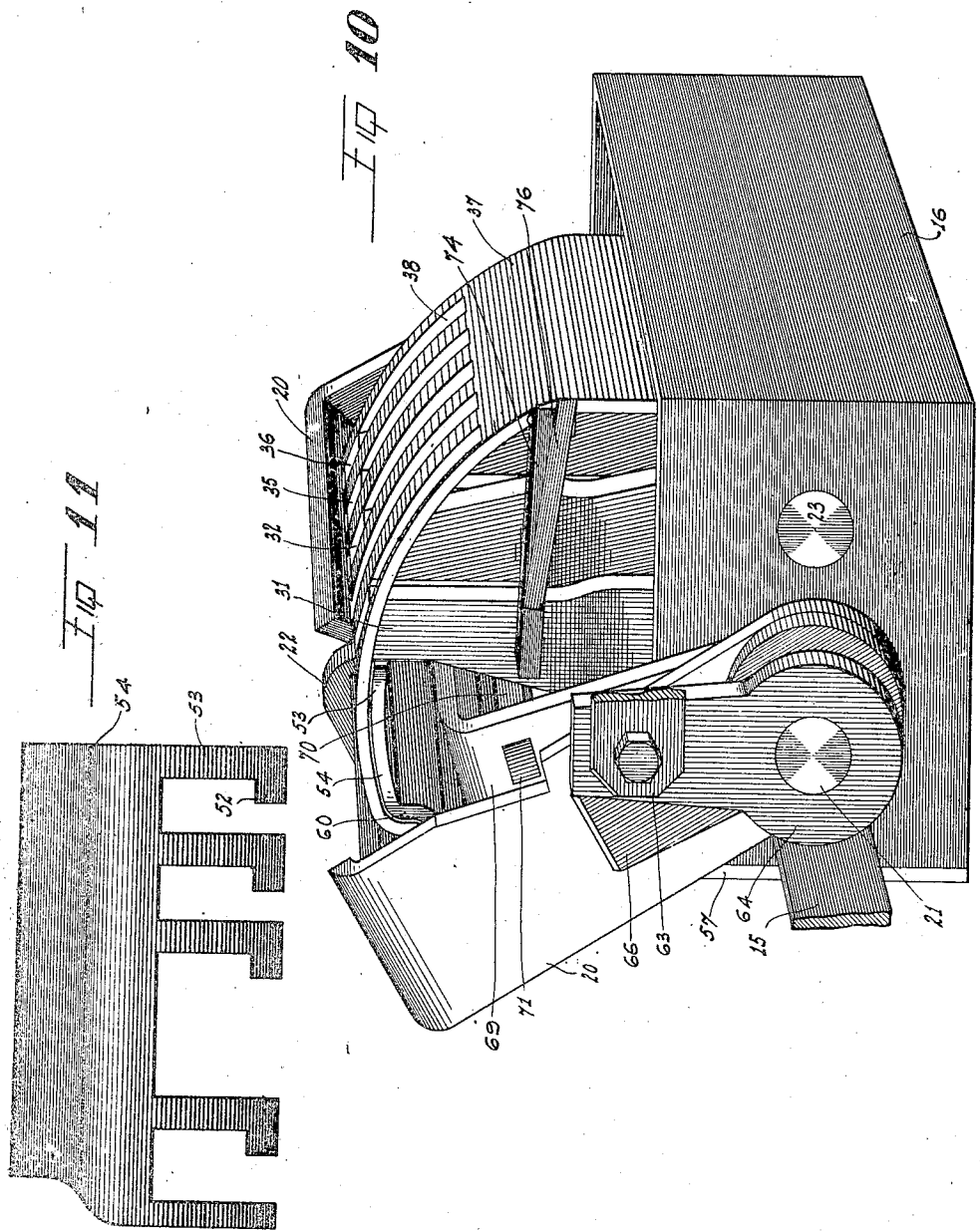

UNITED STATES PATENT OFFICE.

BENJAMIN F. SCHMIDT, OF EXETER, CALIFORNIA.

GEAR-SHIFTING DEVICE FOR MOTOR-VEHICLES.

1,200,431.  Specification of Letters Patent.  Patented Oct. 3, 1916.

Application filed March 6, 1913. Serial No. 752,343.

*To all whom it may concern:*

Be it known that I, BENJAMIN F. SCHMIDT, a citizen of the United States, residing at Exeter, in the county of Tulare, State of California, have invented certain new and useful Improvements in Gear-Shifting Devices for Motor-Vehicles; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in motor vehicles and particularly to a gear shifting mechanism therefor, the object of the invention being to produce a shifting mechanism adapted to do away with the side or center levers and to substitute therefor a small indicating lever mounted on or near the steering wheel of the motor vehicle and adapted to 'move' over a quadrant, which quadrant will contain certain indicating means adapted to show the position at which the lever must be placed to have the gears ready to be shifted into reverse, low, intermediate or high, as may be desired. Then when the mechanism is properly located for said purpose by the movement of such lever, an independent shifting mechanism is operated by means of the use of the clutch or by an independent shifting pedal as may be found most desirable.

A further object of the invention is to produce a shifting mechanism which is absolutely "fool proof" in that the gears cannot be shifted unless the clutch is disengaged and one in which the gears will always return to neutral before being shifted and when in position in any degree, the gears may be locked in such position until shifted. Hence, it can be readily seen that there can be no stripping of gears or other accidental injury to that portion of the motor vehicle due to the ignorance or carelessness of the operator.

A further object of the invention is to produce a simple and inexpensive device, and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a top plan view of the chassis of a motor vehicle showing the relative position of my improved parts thereon. Fig. 2 is a front elevation of my improved shifting mechanism, partly broken out. Fig. 3 is a top plan view of the same, partly broken out. Fig. 4 is a sectional view taken on a line X—X of Fig. 3, but showing the shifting arms in different positions. Fig. 5 is a fragmentary view of a shaft and gear mechanism. Fig. 6 is an end view of the complete device. Fig. 7 is a fragmentary view, in section, taken on a line Z—Z of Fig. 6. Fig. 8 is a detached view of a shifting pedal mechanism. Fig. 9 is a top plan view of a steering wheel showing the relative positions of my improved shifting lever and quadrant. Fig. 10 is a perspective view of the complete mechanism. Fig. 11 is a detached top plan view of a locking member.

Referring now more particularly to the characters of reference on the drawings, in describing my improved structure, the same resolves itself into certain subdivisions of structure, namely, the lever indicating and control means; the sliding positioning dog and shifting arm operating means; the shifting arm mechanism, shafts and gears; the locking and releasing means; and the foot pedal operating means for the sliding positioning dog and shifting arm operating means; and therefore, for the purposes of greater certainty in the description, I will describe each subdivision separately as follows:

*The lever indicating and control means.—* I first provide on the steering wheel 1 a quadrant 2 having indicating points 3 to indicate the positions for placing the gears in reverse, neutral, low, intermediate or high position and I then provide a small lever 4 adapted to move over said quadrant. This lever is fixed on a rod 5 journaled along the steering post 6 and provided on its lower end with a small bar or rod 7 with which it is connected by means of lock nuts 8. On the other end of the member 7, I provide a rod 10 connected with the member 7 with a ball and socket joint 11, the other end of said rod 10 being connected with a bell crank 12 pivotally mounted on a suitable support as at 13 and slidably connected at its other end as at 14 to a bar 15, which bar operates the

*Sliding positioning dog and shifting arm operating means.*—This mechanism comprising the bar 15 which is slidable into a rectangular frame member 16 and provided with an upwardly curving arm 17 projecting through a slotted guide 18. This slotted guide 18 is connected with a bar 19 slidable in the upper side of a rectangular frame 20, which frame is turnably mounted at its lower ends upon a shaft 21 journaled in the frame 16. The said bar 19 is provided at one end with a shifting or engaging dog 22 adapted to operate the

*Shifting arm mechanism, shafts and gears.*—This mechanism comprises the shaft 21 and another shaft 23, the outer ends of said shafts being provided with cranks 24 and 25 respectively, connected with rods 26 and 27 respectively, which rods are connected with the gear mechanism in the gear case 28 which is of any ordinary or the usual type and hence no specific description of the same will be here entered into. Upon the shaft 21 is keyed a gear 29 and on the shaft 23 is loosely mounted a gear 30. On one side of the gear 29 is disposed an upwardly projecting arm 31 and on the opposite side of the gear 29 is secured a similar upwardly projecting arm 32. In practice, these gears and arms constitute one co-acting or operative pair and will be designated hereinafter as pair No. one.

On the shaft 23 is keyed a gear 33 and on the shaft 21 is loosely mounted a gear 34. On one side of the gear 33 is secured an upwardly projecting arm 35 and on the opposite side of the gear 34 is secured an upwardly projecting arm 36. In practice, these gears and arms constitute one co-acting or operative pair and will be designated hereinafter as pair No. two.

Projecting over the gears and arms just described is a curved plate 37 provided with a plurality of slots 38, one for each of the said arms, said arms projecting in alinement with said slots. The ends of said slots fl.. e outwardly as at 39 in order to guide the dog 22 accurately into one of said slots when the frame 20 is moved on its turnable connection on the shaft 21.

Describing now the operation of the arms 31, 32, 35 and 36, I first provide a safety mechanism which consists of a double lock. The first locking mechanism consists of locking the pairs one and two against action as pairs and the other locking means consists in locking each member of each pair against independent individual movement. By this means, presuming the arm 31 to be the one to operate for reverse movement, the arm 32 for low, the arm 35 for intermediate and the arm 36 for high, these as above described will operate in pairs. Pair one will be locked against operation when pair two is being operated by means of an arm 40 pivotally mounted at 41 to any suitable supporting means secured to the frame 16. Each arm is provided with a notch 42 adapted to fit over a pin 43 on one of the arms 31 or 32. Similarly pair No. two may be locked against operation by means of an arm 44 pivotally mounted in a manner similar to the arm 40 and provided with a notch 45 adapted to engage a pin 46 on one of the arms 35 or 36. On the inner end of each of the members 40 and 44 is rigidly secured a cross member 47 and 48 respectively, and connected with each of said members 47 and 48 is a spring 49 and 50 respectively, which normally holds the members 40 or 44 in engagement with the pins 43 or 46. This as will appear will lock both pairs No. one and two against action provided they were not released. However, one pair is released for action when the other is locked by means of the following structure, namely: On the member 15, in alinement with the member 22 and movable as will appear therewith, is a dog 51 which moves under the member 47 or the member 48 according to the position of the parts, the ends of such members 47 and 48 being curved and the end of the member 51 being curved for the purpose of engagement. Hence, as the member 15 is moved to move the dog 22 into alinement with any one of the slots 38, the dog 51 likewise moves and releases one pair of the arms or the other ready for action, the other pair being locked with the vertical arms in neutral or inoperative position. The other locking operation occurs whenever one of the arms of the free operating pair is thrown to such position as to set the gears in any desired ratio and hence, I will describe this locking means in connection with the shifting of the gears.

Presuming that pair No. one is in operative position as shown in Figs. 2 and 3, these would be locked against independent movement after the gears are shifted by means of lugs 52 on projecting arms 53 on a reciprocating bar 54 movable across the path of all of said arms 31, 32, 35 and 36 and being provided with slots back of said lugs to receive said arms as will appear. Said bar 54 is provided with slots 55 movable over pins 56 on a back plate 37 and its normal position at which the lugs 52 bar movement of the arms 31, 32, 35 or 36 is maintained by a spring 58. One outer end of the bar 54 projects in front of the path described by the frame 20 in its movement and the bar 54 and the frame 20 are provided with curved engaging surfaces 59 and 60 respectively, which, when the frame is moved on its turnable connection with the shaft 21, engage and move the bar 54 to cause the lugs 53 to clear the path of movement of the arms 31, 32, 35 or 36. Presuming then, as above set forth, that the arm 31 is to be operated to throw the gears into reverse position, the member 15 would be operated to move the dog into alinement with the slot 38 into which the arm 31 projects. Then the foot pedal mechanism would be operated and hence, in order that the matter may be understood, I will now describe in detail the

*Foot pedal operating means for the sliding positioning dog and shifting arm operating means:*—This mechanism consists of a foot pedal 61 turnably mounted on any suitable rod 62 and flexibly connected by a link 63 with an arm 64 rigidly secured on a sleeve 65 turnable on the shaft 21 and provided with another arm 66 rigidly connected with the frame 20. The pedal 61 has a connection 67 which throws out the clutch pedal 68 of the motor vehicle every time the gears are shifted which insures the clutch being disengaged even though the operator should fail to do it. Referring back now to the operation, the dog 22 is positioned as described by means of the movement of the lever 4 to the point 3 designating reverse and this operates, as has been described, the bar 15 to move the dog 22 into alinement with the slot 38 into which the arm 31 projects. The pedal 61 is then operated which throws the frame 20 forward on its movable connection on the shaft 21 and throws the dog 22 into the above mentioned slot 38. At the same time the surfaces 60 and 58 engage to move the bar 54 and carry the lugs 52 out of the paths of the arms 32. Then as the forward movement of the frame 20 continues, the dog 22 engages the arm 31 driving it downwardly. This action turns the shaft 21 to operate the arm 24 to shift the gears in the gear case 28 to the proper position. Incidentally the gear 29 operates the gear 30 and moves the arm 32 in the direction opposite to that taken by the arm 31 and hence, moves it into one of the slots back of one of the lugs 52. The gears being then set in proper position, the pedal 61 is released and then the usual spring on the clutch pedal or an independent spring 61ª on the pedal 61 will pull all the parts back into normal position. This will retract the dog 22 out of the slot 38 and will move the frame 20 out of engagement with the bar 54. The spring 58 will then pull the bar 54 into normal position causing the lugs 52 to bar the path of the arms and this will prevent the arm 32 from moving out of the slot back of the lug 52 and hence, being connected with the arm 31 by the gear mechanism described, it will lock the gears in position and they cannot again be changed until the operation of the foot pedal is again had.

Another valuable feature of my invention is the fact that every time a change of gears is made, the device automatically returns all the gears to neutral position prior to the change being made, thus preventing the stripping of gears by reason of an error being made in the shifting operation. This neutral positioning is occasioned by means of the following structure and operation, namely: Within the mechanism is provided a rectangular frame 69 turnably mounted on the shaft 21 and adapted to engage the arms 31, 32, 35 and 36. Slidably disposed through said frame 69 is a bar 70 having a catch 71 projecting through one end of said member 69. This catch is curved on one side and square on the other as shown and the square side is adapted to be engaged by the frame 20 in its movement just after it has moved the bar 54 and its lugs 52 out of the path of the arms mentioned above. Presuming then that one of said arms was in one of the slots back of one of the lugs 52 to lock the gears in whatever position they might be and that a change of gears was to be made, then this engagement by the member 20 with the member 71 would carry the member 69 forward causing it to engage the arm which was in said slot after the path out of said slot had been opened as aforesaid. This would carry such arm and incidentally its corresponding arm of that pair to normal neutral position and the moment this position was reached, a curved dog 72 on the other end of the member 70 would engage a correspondingly curved trip member 73 which would pull the member 70 and incidentally the catch 71 out of engagement with the member 20 and then the dog 22 would engage and carry one of the arms into such position as would shift the gears as per the shifting operation described above. After the member 69 has carried the arms to neutral position and the member 20 has passed over as described and drives one of the arms downwardly and the other arm of the pair backwardly, the backward movement of said arm strikes the member 69 and throws it back to normal position which carries the member 72 out of engagement with the trip member 73 and a spring 74 then drives the member 70 back into the path of the member 20 again and in its backward movement the said member 20 rides past said member 71 by reason of the curved surface above described. At this point it might be well to state that I have provided a safety means to prevent trouble in case the member 71 should break or otherwise become inoperative and this consists of a pivotal arm 75 held by a spring 76, of lesser strength than the spring 74, in the path of the catch 71. In normal position, since the spring 74 is stronger than the spring 76, when the member 71 encounters a curved end on the member 75, it moves the same out of its path. If however, the members 70—71 should become inoperative, then the member 20 would strike against the end of the member 75 and be stopped from further action which would prevent serious trouble by shifting the mechanism improperly.

While I have described the above operation only in connection with the shifting of one arm of one pair and the coöperation of the other arm therewith, still in practice the operation for all the arms would be similar and hence no detailed separate description of each one will be entered into, but it is simply to be remembered that the shifting of each arm changes the gears to the various positions described, the initial positioning being accomplished as described by the operation of the lever 4.

As above described, every time a shifting operation is accomplished, the gears are first returned to neutral position, but this course is simply a step in the shifting mechanism and therefore in order to place the gears in neutral position and leave them there, I provide a special slot 38$^a$, and into which no arm projects, to which, by the operation of the lever 4, the dog 22 will be carried and then by the operation of the pedal 61 said dog will be driven into said slot 38$^a$ and it will carry the member 69 to drive all the arms 31—32—35 and 36 to neutral position and then since said dog 22 will not engage any of said arms in said slot 38$^a$, upon the return of the parts to normal position, all the gears will be in neutral position.

From the foregoing description it will readily appear that I have produced a device which is absolutely safe in all respects against causing any gear trouble and at the same time provides a rapid, easy and effective shifting mechanism which is absolutely positive in its action.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described comprising two rotatable shafts, two pairs of arms on each of said shafts, one arm of each pair being keyed to its shaft and the corresponding arm of each pair being loosely mounted on its shaft, geared connections between each pair of arms, and means for engaging each of said arms independently of the other and moving the same, as described.

2. The combination with swinging arms each operable to effect a gear change, of a member slidable transversely of the vertical position of said arms, and means for turning said slidable member into engagement with either of said arms to effect a gear change.

3. A device of the character described comprising an actuating means, a turnable frame, a slidable member adapted to be moved along said frame by said actuating means, a gear shifting mechanism, and a mechanism for operating said turnable frame to cause said slidable member to actuate said gear shifting mechanism, as described.

4. A device of the character described comprising two shafts, arms mounted on said shafts in pairs, one arm of each pair being keyed to one shaft and the corresponding arm being turnably disposed on the other shaft, means connecting each one of each pair of arms whereby the movement of one arm in one direction will move the other arm of said pair in the opposite direction, and means for operating said arms, as described.

5. A device of the character described comprising two shafts, arms mounted on said shafts in pairs, means for operating said arms to turn said shafts, and means for locking one pair of said arms against action independently of the other, as described.

6. A device of the character described comprising two shafts, arms mounted upon said shafts in pairs, means for moving said arms, means for locking one pair of said arms against action independently of the other pair, and means for locking each arm of each pair against action independently of its corresponding arm of said pair, as described.

7. A device of the character described comprising a pair of swinging arms each operable to effect a gear change, and means for locking said arms against independent action with respect to each other, as described.

8. A device of the character described comprising two shafts, arms mounted on said shafts in pairs, and means for locking said arms against independent action with respect to each other, as described.

9. A device of the character described comprising the combination with a plurality of swinging arms each operable to effect a gear change, a turnable frame, means on said frame for engaging said arms, a member slidable across the path of said frame and of said arms, means on said frame adapted to engage said slidable member and move the same out of the path of said arms and means for returning said slidable member to normal position when disengaged from said frame, as described.

10. A device of the character described comprising the combination with a plurality of arms each operable to effect a gear change, of a member provided with a plurality of lugs movable across the path of said arms, said member being provided with a plurality of slots back of said lugs adapted to receive said arms, means for engaging said arms, said means being adapted to move said lugs out of the path of said arms, and means for returning said lugs to normal position when disengaged from said last named means, as described.

11. A device of the character described comprising the combination with a plurality of arms each operable to effect a gear change, of two turnable members, one of said turnable members being arranged for engagement by the other member to cause the first named member to move all of said arms into position where no gear change will be effected, means for then disengaging the first member, and means for returning the first member to normal position, as described.

12. The combination of transmission mechanism embodying gear-changing means, a clutch coöperative therewith, a pedal operative to engage and disengage the clutch, a member for operating said means to effect different gear changes, means to set said member for different selected gear changes, and means connecting said member to said pedal and operative to effect the selected gear change when said pedal is operated to disengage the clutch.

13. The combination with a plurality of swinging arms each operable to effect a gear change, a means normally blocking the path of the arms, means for first moving the blocking member out of the path of the arms and subsequently moving all of said arms into a position where no gear change will be effected and means for subsequently engaging one of said arms to effect a gear change, as described.

14. The combination with a plurality of swinging arms each operable to effect a gear change, of a member arranged for engagement with said arms to move them all into a position wherein no gear change will be effected, and a member operable to follow the first named member and engage and move one arm to effect a gear change, as described.

15. The combination with a plurality of swinging arms each operable to effect a gear change, of a member arranged for engagement with said arms to move them all into a position wherein no gear change will be effected, a member operable to follow the first named member and engage and move one arm to effect a gear change, and means operable by the last named arm to return the first named member to normal position, as described.

16. The combination with a plurality of swinging arms each operable to effect a gear change, of a member arranged for engagement with said arms to move them all into a position wherein no gear change will be effected, a member operable to follow the first named member and engage and move one arm to effect a gear change, and means whereby the movement of the last named arm will move one of the other arms against the first named member to return it to normal position, as described.

17. The combination with a plurality of swinging arms each operable to effect a gear change, an actuating member for moving the arms, a member normally blocking the movement of said arms, and means for moving said blocking member out of the path of the arms prior to the engagement of the actuating member with the arms, as described.

In testimony whereof I affix my signature in presence of two witnesses.

BENJAMIN F. SCHMIDT.

Witnesses:
JOSHUA B. WEBSTER,
PERCY S. WEBSTER.